United States Patent
Lee et al.

(10) Patent No.: US 10,999,431 B1
(45) Date of Patent: May 4, 2021

(54) SYSTEM AND METHOD FOR SWITCHING CALL AGENTS IN TELECOMMUNICATIONS RELAY SERVICE

(71) Applicant: Mezmo Corporation, Buena Park, CA (US)

(72) Inventors: Sungho Lee, Fullerton, CA (US); Wonjae Cha, Yongin-si (KR)

(73) Assignee: Mezmo Corporation, Buena Park, CA (US)

( * ) Notice: Subject to any disclaimer, the term of this patent is extended or adjusted under 35 U.S.C. 154(b) by 0 days.

(21) Appl. No.: 16/805,630

(22) Filed: Feb. 28, 2020

(51) Int. Cl.
| | |
|---|---|
| H04M 11/00 | (2006.01) |
| H04M 3/42 | (2006.01) |
| G10L 15/22 | (2006.01) |
| H04M 3/58 | (2006.01) |
| G10L 15/30 | (2013.01) |
| G10L 15/26 | (2006.01) |

(52) U.S. Cl.
CPC ......... *H04M 3/42391* (2013.01); *G10L 15/22* (2013.01); *G10L 15/26* (2013.01); *G10L 15/30* (2013.01); *H04M 3/58* (2013.01)

(58) Field of Classification Search
None
See application file for complete search history.

(56) References Cited

U.S. PATENT DOCUMENTS

| | | | | |
|---|---|---|---|---|
| 2005/0094775 | A1* | 5/2005 | Smith, Jr. | H04M 3/42391 379/52 |
| 2009/0262906 | A1* | 10/2009 | Goldman | H04M 3/42391 379/52 |
| 2010/0312556 | A1* | 12/2010 | Ljolje | G10L 15/07 704/244 |
| 2017/0324868 | A1* | 11/2017 | Tamblyn | G06Q 10/06316 |
| 2018/0012598 | A1* | 1/2018 | Thirukovalluru | G06F 16/313 |
| 2018/0270350 | A1* | 9/2018 | Engelke | G10L 15/265 |

\* cited by examiner

*Primary Examiner* — Quoc D Tran
(74) *Attorney, Agent, or Firm* — Heedong Chae; Lucem, PC

(57) ABSTRACT

A system and a method for switching call agents in telecommunications relay service includes a TRS server system. The TRS server system includes a voice handler for processing voice data, a text handler for processing text data, and a controller for controlling, establishing, and terminating voice paths and data paths. The voice handler transmits a peer's voice to a first CA such that the first CA transcribes and converts the peer's voice into text data. The text handler receives the text data generated by the first CA. The controller selects a second CA; establishes a voice path and a data path between the second CA and the TRS server system; and terminate the voice path and data path associated with the first CA.

20 Claims, 5 Drawing Sheets

SYSTEM AND METHOD FOR SWITCHING CALL AGENTS IN TELECOMMUNICATIONS RELAY SERVICE

FIELD OF THE INVENTION

The present invention relates to a system and a method for switching call agents in a telecommunications relay service ("TRS"). Specifically, the present invention relates to a system and a method for switching call agents without service interruption or quality degradation in Internet Protocol Relay ("IP-Relay"), Captioned Telephone Service ("CTS"), or Internet Protocol Captioned Telephone Service ("IP-CTS").

BACKGROUND OF THE INVENTION

With an increasing number of people who are deaf or hard of hearing (collectively "users"), demand is increasing for telecommunications relay services, including IP-Relay, CTS, and IP-CTS, with human call agents ("CA"s) at caption centers providing transcription service to users. Accordingly, the human CAs are very likely to experience increased tiredness from the extra work burden, which may lead to a lack of concentration when handling large volume of calls and/or providing services—such as Interactive Voice Response (IVR)—to users, the latter of which often involves lengthy calls. As a result, the quality of transcription and overall service may decline.

Furthermore, there is an increased possibility of system errors caused by increased complexity of service equipment. If these errors occur during the service, text data may be lost or duplicated, or the call may be unexpectedly disconnected, all of which degrade service quality and, subsequently, increase user dissatisfaction—especially if users faced long queue times for the IVR service.

In order to deliver a higher quality of service, many caption centers schedule work shifts and distribute calls among a plurality of CAs. Further, when transcription accuracy is not the highest priority, Automatic Speech Recognition ("ASR") using Artificial Intelligence ("AI") technology may be developed and deployed to reduce burden and tiredness experienced by human CAs when their workload becomes overwhelming. Yet in reality, ASR cannot provide service with the quality that satisfies customers' needs. Therefore, it is best to utilize ASR in conjunction with human CAs in the proper ratio.

In some instances, a CA has to be switched to another CA in the middle of a call. For example, the CA needs to leave for personal reasons or because the call extends beyond the end of a shift; technical issues may arise from the CA's end; or the user may request another agent (from a human agent to another human agent, from a human agent to ASR, or from ASR to a human agent). In such cases, however, some text data may be lost or duplicated while the call is being transferred to another CA. Accordingly, the overall service quality may suffer despite having a plurality of CAs assigned to shifts.

Accordingly, there is a need for a system and a method for switching call agents between human CAs or between a human CA and ASR, while the transcribed text data is neither lost nor duplicated. This invention is directed to solve these problems and satisfy the long-felt market need.

SUMMARY OF THE INVENTION

The present invention provides a system and a method for switching call agents in TRS wherein the CAs transcribe and convert a peer's voice into text data and provide the text data to a user of the TRS.

The object of the present invention is to provide a system for switching call agents in TRS, comprising a TRS server system that includes: a voice handler for processing voice data; a text handler for processing the voice data; and a controller for controlling, establishing, and terminating voice paths and data paths. The voice handler is configured to receive the peer's voice via a voice path V103 and transmit the peer's voice to a first CA of a caption center via a voice path V203. The text handler is configured to receive the text data generated by the first CA via a data path T203, and forward the text data to the user via a data path T202. The controller is configured to select a second CA; establish a voice path V204 between the second CA and the voice handler; establish a data path T204 between the second CA and the text handler; and terminate the voice path V203 and data path T203 associated with the first CA.

Another object of the present invention is to provide a method for switching call agents in TRS, comprising the steps of: transmitting a peer's voice from a voice handler of a TRS server system to a first CA via a voice path V203; transmitting text data generated by the first CA to a text handler of the TRS server system via a data path T203; forwarding the text data generated by the first CA from the text handler to the user via a data path T202; selecting a second CA by a controller of the TRS server system; establishing a voice path V204 between the voice handler and the second CA by the controller; establishing a data path T204 between the text handler and the second CA by the controller; and terminating the voice path V203 and data path T203 associated with the first CA by the controller.

The advantages of the present invention are: (1) the present invention prevents the transcribed text data from being lost during the call transfer; (2) the controller of the present invention prevents any service interruption caused by unexpected disconnection between the first CA and the TRS server system; (3) the call transfer may be smooth and unannounced without any interruption of the TRS; (4) the idle time of the present invention allows time for the second CA to get used to the transcription and thus provide transcripts with great quality to the user; (5) the idle time allows the controller enough time to ensure that the voice path and the data path are successfully connected to the second CA; (6) the present invention prevents the user from receiving redundant text data during the call transfer; and (7) the present invention maintains the transcription quality regardless of unexpected circumstances and thus, provides top-notch service to users.

It is to be understood that all the advantages expected or anticipated by the description of the present invention are disclosed herein as part of the advantages of the present invention, while each of them may not be specifically described herein.

Although the present invention is briefly summarized, the fuller understanding of the invention can be obtained by the following drawings, detailed description and appended claims.

BRIEF DESCRIPTION OF THE DRAWINGS

These and other features, aspects, and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to limit the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
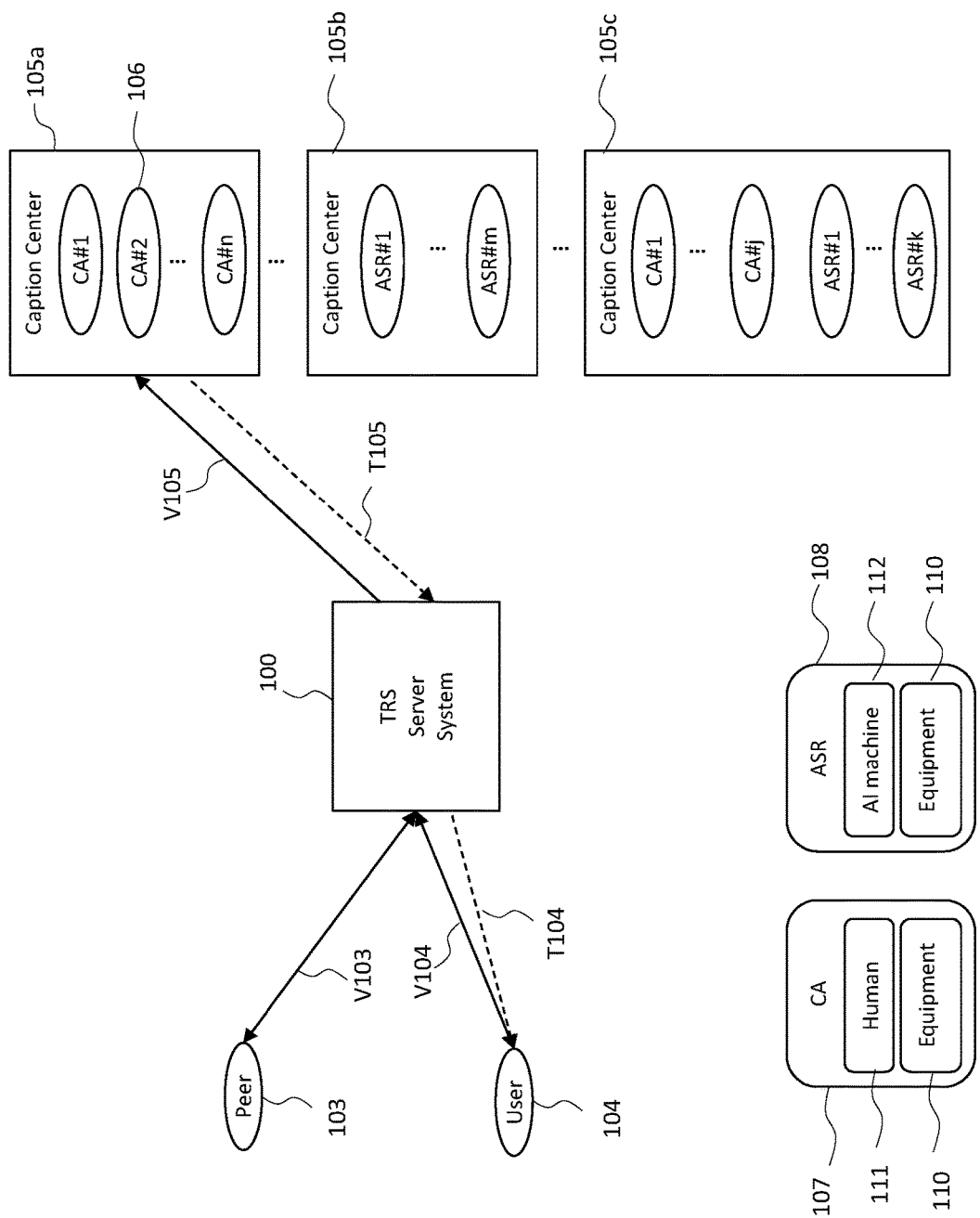
FIG. 1 is a diagram showing a configuration of a TRS server system connected to a peer, a user, and a plurality of Caption Centers.

FIG. 1 shows a configuration of a TRS server system 100 connected to a peer 103, a user 104, and a caption center 105. As shown in FIG. 1, the user 104 of the TRS is connected to the peer 103, the other end of conversation, by the TRS server system 100. The caption center 105 may comprise a plurality of caption centers 105a, 105b, 105c, each having one or more CAs who transcribe and convert what the peer 103 says into text data. In the present invention, the TRS is IP-relay, CTS, or IP-CTS.

The TRS server system 100 receives the peer's voice via a voice path V103 between the TRS server system 100 and the peer 103. Then, the peer's voice is transmitted to the user 104 via a voice path V104 between the TRS server system 100 and the user 104, and simultaneously to a CA 106 at the caption center 105 via a voice path V105 between the TRS server system 100 and the caption center 105.

The CA 106 is assigned to transcribe and convert the peer's voice into text data, and transmit the transcribed text data to the TRS server system 100 via a data path T105 between the caption center 105 and the TRS server system 100. The CA 106 may be a human CA 107 or ASR engine 108. Then, the TRS server system 100 transmits the text data received from the CA 106 to the user 104 via a data path T104 between the user 104 and the TRS server system 100.

Further, the TRS server system 100 receives the user's voice via the voice path V104 between the user 104 and the TRS server system 100, and immediately transmits the user's voice to the peer 103 via the voice path V103 between the peer 103 and the TRS server system 100. The TRS server system 100 is configured such that the user's voice is not transmitted to the caption center 105 for privacy reasons.

The caption center 105 may include at least one or more of the following: the caption center 105a having only human CAs 107; the caption center 105b having only ASR engines 108; and the caption center 105c having a combination of human CAs 107 and ASR engines 108. In the present invention, the human CA 107 is a generic term for a human 111 and any associated equipment 110 including transcribing devices, computers, and transmission equipment that the human 111 may utilize. Likewise, an ASR engine 108 is a generic term for transcribing AI machines 112 and any associated equipment 110 including computers and transmission equipment.

Hereinafter, a system and a method of switching CAs in the middle of a call because of an end to their shifts, the CA's personal reasons, user's request, technical issues, or unstable/lost communication link to the server will be described in FIGS. 2-4.

Figure 2:
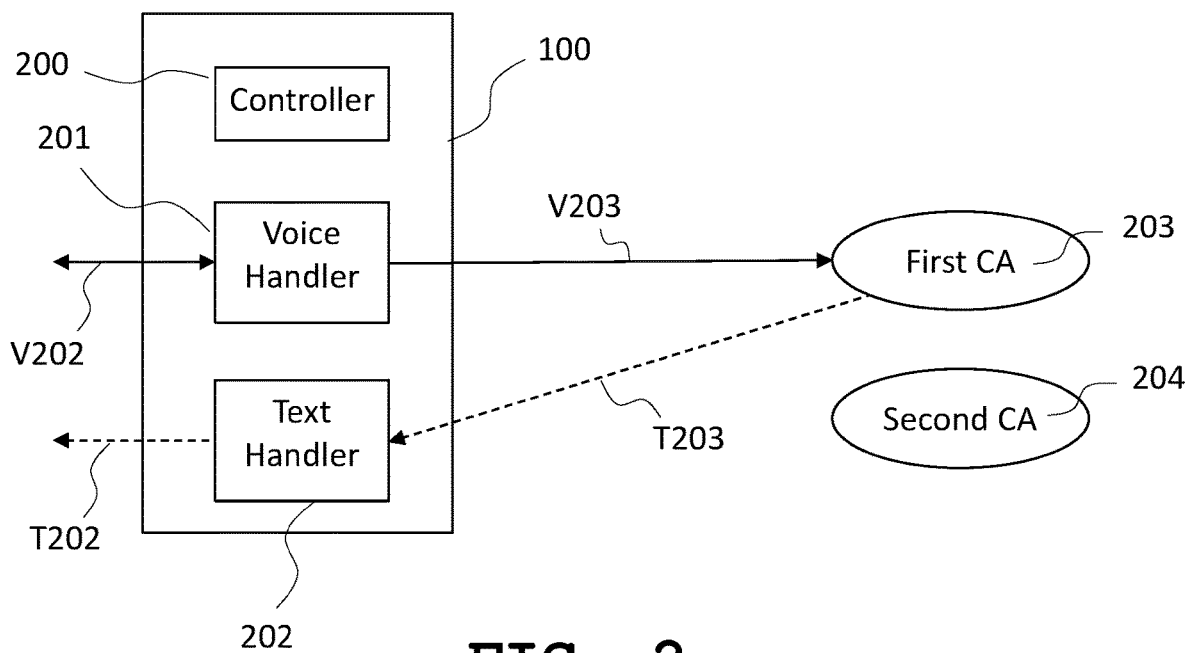
FIG. 2 is a diagram showing voice paths and data paths across a user and a first CA, wherein the first CA provides transcription service to the user, according to the present invention.

FIG. 2 illustrates voice paths and data paths across the user 104 and a first CA 203 according to the present invention. As illustrated in FIG. 2, the TRS server system 100 includes a voice handler 201 for processing voice data; a text handler 202 for processing text data; and a controller 200 for controlling the voice handler 201 and the text handler 202, and performing operations associated with the TRS, such as controlling, establishing, and terminating voice paths and data paths associated with the TRS.

As shown in FIG. 2, a voice path V202 is connected to the voice handler 201 such that the voice handler 201 may receive voice data from the peer 103 or the user 104, and transmit voice data to the peer 103 or the user 104. The voice path V202 may be the same as or connected to the voice path V103 shown in FIG. 1, and/or may be the same as or connected to the voice path V104 shown in FIG. 1. In this embodiment, the peer's voice is transmitted to the voice handler 201 of the TRS server system 100 via the voice path V202 (or V103 shown in FIG. 1). Then, the voice handler 201 transmits the received peer's voice to the user 104 via the voice path V202 (or V104 shown in FIG. 1). Simultaneously, the voice handler 201 transmits the same peer's voice to the first CA 203 via a voice path V203. The voice path V203 may be the same as or connected to the voice data V105 shown in FIG. 1.

The first CA 203 is assigned to transcribe and convert the peer's voice into text data, and transmit the text data to the text handler 202 via a data path T203 connected to the TRS server system 100. The data path T203 may be the same as or connected to the data path T105 shown in FIG. 1. Then, the text handler 202 of the TRS server system 100 transmits the text data generated by the first CA 203 to the user 104 via a data path T202 connected to the user 104. The data path T202 may be the same as or connected to the data path T104 shown in FIG. 1.

Further, the voice handler 201 receives the user's voice via the voice path V202 (or V104 shown in FIG. 1) and transmits the user's voice to the peer 103 via the voice path V202 (or V103 shown in FIG. 1). The voice handler 201 is configured to not transmit the user's voice to the first CA 203 for privacy reasons.

In the present invention, the first CA 203 may be the human CA 107 or ASR engine 108. In an embodiment, a user preference between the human CA 107 or ASR engine 108 is saved in the TRS server system 100 or the user 104 is asked by the TRS server system 100 before the user 104 is connected to the first CA 203 so that the first CA 203 is selected according to the user's preference. However, if no human CAs 107 are available for the user 104 at the moment, the TRS server system 100 may temporarily assign the ASR engine 108 to the user 104, and then notify the user 104 as soon as the human CA 107 becomes available. Then, the user 104 may select to switch to another CA or maintain the current CA.

Figure 3:
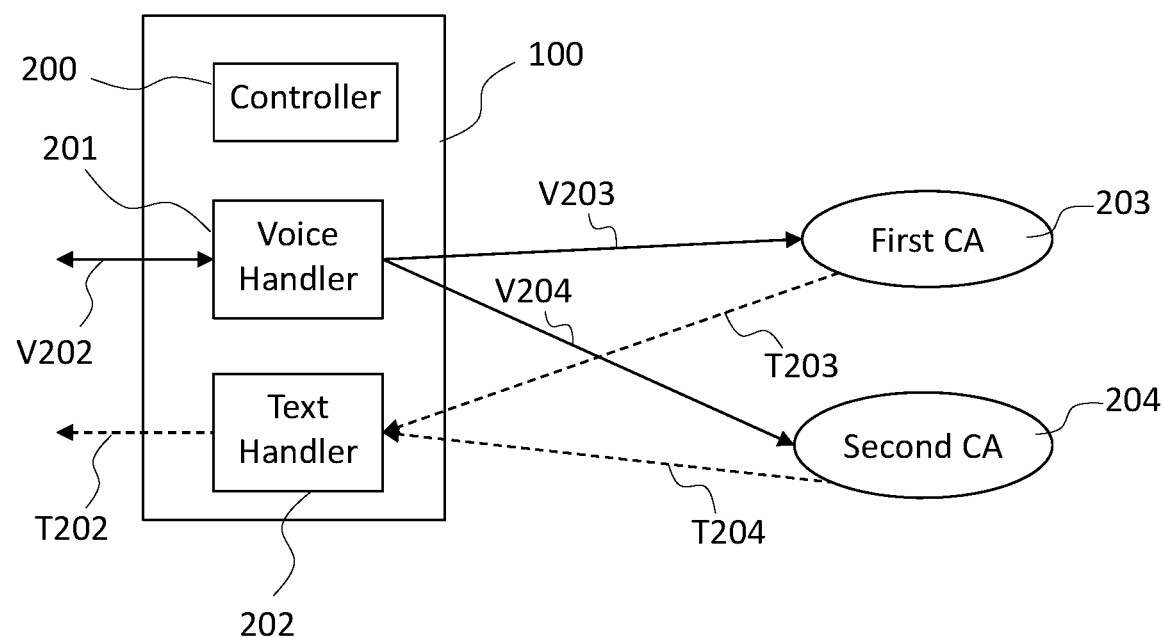
FIG. 3 is a diagram showing voice paths and data paths across a user, a first CA, and a second CA, wherein the first CA is about to be switched to the second CA, according to the present invention.

FIG. 3 illustrates voice paths and data paths across the user 104, first CA 203, and second CA 204, wherein the first CA 203 is to be switched to the second CA 204, according to the present invention. If the first CA 203 can no longer continue to provide the service, the first CA 203 may request to the controller 200 of the TRS server system 100 to assign the second CA 204 who can take over the service. Similarly, if the user 104, for any reason, wants to switch CAs (e.g. from a human CA to ASR, from ASR to a human CA, or from a human CA to another human CA), the user 104 may request to the controller 200 to assign the second CA 204 who can take over the service. As soon as the controller 200 receives such requests, the controller 200 selects a second CA 204, and establishes a voice path V204 and a data path T204 associated with the second CA 204. Furthermore, the controller 200 may be configured to detect a network connection between the first CA 203 and the TRS server system 100 as being unstable or lost. In such cases, the controller 200 may autonomously select the second CA 204 who can take over the service from the first CA 203, and establish the voice path V204 and data path T204 associated with the second CA 204.

The controller 200 is configured to confirm that the second CA 204 is successfully connected to the voice handler 201 and the text handler 202. After confirmation, the controller 200 controls the voice handler 201 such that the peer's voice received from the voice path V202 (or V103 as shown in FIG. 1) may be transmitted to the second CA 204 as well as the first CA 203. As shown in FIG. 3, the voice handler 201 transmits the peer's voice to the first CA 203 via the voice path V203, and to the second CA 204 via the voice path V204. Further, the text handler 202 receives the text data generated by the first CA 203 via the data path T203, and receives the text data generated by the second CA 204 via the data path T204. At this stage, when conditions for the first CA 203 and the TRS server system 100 are determined to be appropriate, the controller 200 controls the text handler 202 such that the text data generated by the second CA 204 is discarded instead of being forwarded to the user 104. In other words, the text handler 202 forwards only the text data generated by the first CA 203 to the user 104. This may prevent any misunderstanding or confusion experienced by the user 104 if the user 104 receives redundant text data from both the first CA 203 and the second CA 204. Further, the controller 200 may also evaluate the connection between the second CA 204 and the TRS server system 100. The text data generated by the first CA 203 is forwarded from the text handler 202 to the user 104 via the data path T202 (or T104 as shown in FIG. 1).

The second CA 204 may be a human CA 107 or ASR engine 108. In an embodiment, the algorithm for selecting the second CA 204 considers one or more of the following factors: the user preference; a round-trip delay time between the TRS server system 100 and the second CA 204; a language of the peer 103; a type of spoken language (i.e. colloquial or formal) of the peer 103 and the subject matter which the spoken language is directed to (i.e. engineering, medicine, telecommunications, etc.); a type of call (i.e. whether it is a personal or conference call); previous client feedback of CAs; quality evaluation data of past transcripts of CAs, and the like.

Figure 4:
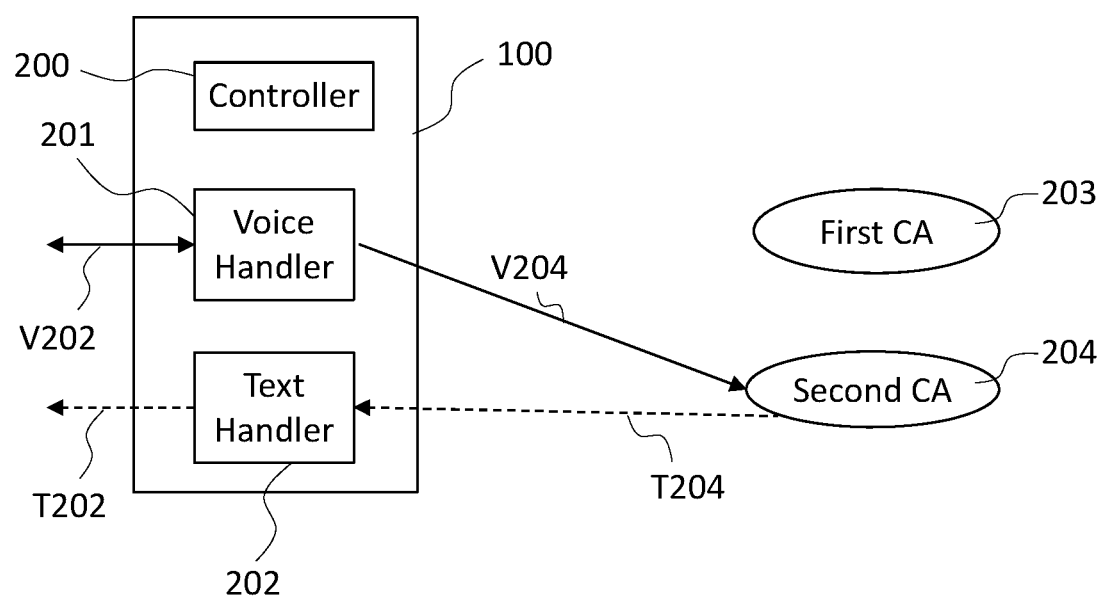
FIG. 4 is a diagram showing voice paths and data paths across a user and a second CA, wherein the second CA has taken over the call and provides the transcription service to the user, according to the present invention.

FIG. 4 illustrates voice paths and data paths across the user 104 and second CA 204, wherein the second CA 204 has taken over the service from the first CA 203, according to the present invention. The controller 200 is configured to control the voice handler 201 and the text handler 202 to respectively terminate the voice path V203 and the data path T203, after receiving a confirmation of the first CA 203 or upon its own determination to terminate the paths. As a result, only the voice path V204 and data path T204 associated with the second CA 204 remain connected to the TRS server system 100, as shown in FIG. 4.

At this stage, the first CA 203 no longer receives the peer's voice, generates the text data, or transmits the text data. In other words, the peer's voice is transmitted from the voice handler 201 only to the second CA 204 via the voice path V204, and the text data is generated only by the second CA 204. Therefore, the text data generated by the second CA 204 is transmitted to the text handler 202 via the data path T204, and forwarded to the user 104 via the data path T202 (or T104 as shown in FIG. 1). As such, the second CA 204 has completely replaced the first CA 203. In the case where the subsequent switch from the second CA 204 to a new CA is necessary, the second CA 204 will be treated as the first CA 203.

Figure 5:
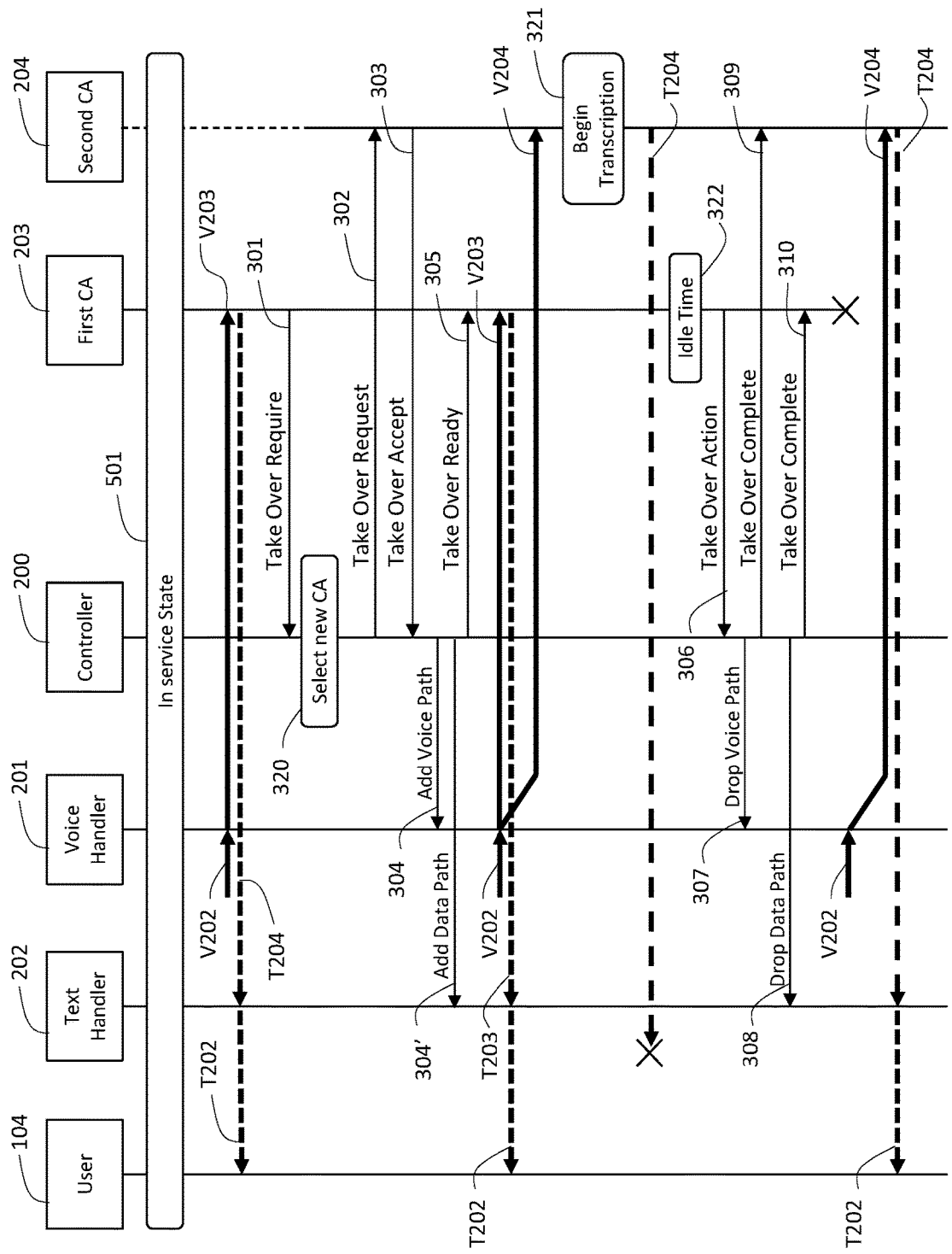
FIG. 5 is a message sequence chart for switching CAs according to the present invention.

FIG. 5 is a message sequence chart for switching CAs according to the present invention. In a service state 501, all communication paths (i.e. voice paths and data paths) associated with the TRS are successfully connected across the user 104, peer 103, TRS server system 100, and first CA 203. In this service state 501, the voice handler 201 of the TRS server system 100 receives the peer's voice and transmits the peer's voice to the first CA 203 who is assigned to provide transcription service to the user 104. The first CA 203 transcribes and converts the voice data into the text data and transmits the text data to the text handler 202 of the TRS server system 100. Then, the text handler 202 forwards the received text data to the user 104.

If the first CA 203 can no longer proceed with providing the service, the first CA 203 may send a CA switch request to the controller 200. The request may be in the form of: sending a "Take Over Require" message 301 to the controller 200; clicking on or selecting a predefined button; or any other means that provides the equivalent function. After receiving this request, the controller 200 selects the second CA 204 who can take over the service, as indicated by box 320.

Alternatively, in the case where the user 104, for any reason, wants to switch CAs (i.e. from a human CA to ASR, from ASR to a human CA, or from a human CA to another human CA), the user 104 may send a CA switch request to the controller 200 (not shown in FIG. 5). The request may be in the form of: clicking on or selecting a predefined button, or any other means that provides the equivalent function. After receiving this request, the controller 200 may inform the first CA 203 about the request, and select the second CA 204 who can take over the service, as indicated by box 320.

The algorithm for selecting the second CA 204 considers one or more of the following factors: the user preference; a round-trip delay time between the TRS server system 100 and the second CA 204; a language of the peer 103; a type of spoken language (i.e. colloquial or formal) of the peer 103 and the subject matter which the spoken language is directed to (i.e. engineering, medicine, telecommunications, etc.); a type of call (i.e. whether it is a personal or conference call); previous client feedback of CAs; quality evaluation data of past transcripts of CAs, and the like.

As soon as the second CA 204 is selected, the controller 200 sends the request to the second CA 204 to take over the service. The request may be in the form of: sending the "Take Over Request" message 302 to the second CA 204 or any other means that provides the equivalent function. In response to the request, the second CA 204 may send an acknowledgement to the controller 200 to accept the request. The acknowledgement may be in the form of: sending the "Take Over Accept" message 303 to the controller 200; clicking on or selecting a predefined button; or any other means that provides the equivalent function.

After receiving the acknowledgement from the second CA 204, the controller 200 may control the voice handler 201 to establish the voice path V204 between the second CA 204 and the voice handler 201, as illustrated by a step 304. After the voice path V204 is established, the voice handler 201 transmits the peer's voice simultaneously to the first CA 203 via the voice path V203, and to the second CA 204 via the voice path V204. The second CA 204 begins transcription, as indicated by box 321, as soon as the second CA 204 hears the peer's voice. Similarly, the controller 200 may control the text handler 202 to establish the data path T204 between the text handler 202 and the second CA 204, as indicated by a step 304'.

After establishing the voice path V204 and data path T204, the controller 200 sends a confirmation to the first CA 203 to inform that the second CA 204 is ready to take over the service. The confirmation may be in the form of: sending a "Take Over Ready" message 305 to the first CA 203, or any other means that provides the equivalent function. The text handler 202 receives the text data generated by the first CA 203 via the data path T203, and receives the text data generated by the second CA 204 via the data path T204. At this stage, wherein both the first CA 203 and the second CA 204 are connected to the TRS server system 100, the text handler 202 is configured to forward the text data generated by the first CA 203 to the user 104, and discard the text data generated by the second CA 204.

When the user 104 begins to talk and the peer 103 begins to listen, the controller 200 may recognize such a timing and thereby control the voice handler 201 such that the first CA 203 no longer hears the peer's voice. At this point, the first CA 203 sends a confirmation to the controller 200 on termination of the voice path V203 and data path T203. The confirmation may be in the form of: sending a "Take Over Action" message 306 to the controller 200; clicking on or selecting a predefined button; or any other means that provides the equivalent function. Alternatively, the first CA 203 may determine the timing for sending such a confirmation. The confirmation may be in the form of: sending the "Take Over Action" message 306 to the controller 200; clicking on or selecting a predefined button; or any other means that provides the equivalent function.

In an embodiment, a period of idle time 322 may occur before the confirmation of the first CA 203 on the termination of the voice path V203 and data path T203. The idle time 322 may be determined by one or more of the following factors: a predefined minimum time period after the second CA 204 begins to generate the text data; a predefined maximum time period after the second CA 204 begins to generate the text data; and a predefined minimum word count of the text data generated by the second CA 204. For example, the first CA 203 may not be allowed to confirm the termination of the voice path V203 or data path T203 until the second CA 204 has generated enough amount of text data. This allows time for the second CA 204 to get used to the transcription and thus, provide transcripts with great quality to the user 104. Further, the idle time 322 may allow the controller 200 enough time to ensure that the voice path V204 and the data path T204 are successfully connected to the second CA 204.

After receiving the confirmation from the first CA 203, the controller 200 controls the voice handler 201 to terminate the voice path V203 connected to the first CA 203, as indicated by a step 307. Likewise, the controller 200 controls the text handler 202 to terminate the data path T203 connected to the first CA 203, as indicated by a step 308. From this point, the text data generated by the second CA 204 is forwarded to the user 104. Next, the controller 200 sends a notification to the second CA 204 to inform that the second CA 204 has taken over the service from the first CA 203. The notification may be in the form of: sending a "Take Over Complete" message 309 to the second CA 204 or any other means that provides the equivalent function. Likewise, the controller 200 sends a notification to the first CA 203 so that the first CA 203 may free up any resources or equipment used for providing the service. The notification may be in the form of sending a "Take Over Complete" message 310 to the first CA 203 or any other means that provides the equivalent function. In the case where the subsequent switch from the second CA 204 to a new CA is necessary, the second CA 204 will be treated as the first CA 203.

In the case where the controller 200 detects a network connection between the first CA 203 and the TRS server system 100 as being unstable or lost, the controller 200 may autonomously select the second CA 204 who can take over the service, as indicated by box 320. As soon as the second CA 204 is selected, the controller 200 sends the request to the second CA 204 to take over the service. The request may be in the form of: sending the "Take Over Request" message 302 to the second CA 204 or any other means that provides the equivalent function. In response to the request, the second CA 204 may send the acknowledgement to the controller 200 to accept the request. The acknowledgement may be in the form of: sending the "Take Over Accept" message 303 to the controller 200; clicking on or selecting a predefined button; or any other means that provides the equivalent function.

After receiving the acknowledgement from the second CA 204, the controller 200 may control the voice handler 201 to establish the voice path V204, as illustrated by the step 304.

As soon as the voice path V204 is established, the voice handler 201 transmits the peer's voice to the second CA 204 via the voice path V204. The second CA 204 begins transcription, as indicated by box 321, as soon as the second CA 204 hears the peer's voice. Similarly, the controller 200 may control the text handler 202 to establish the data path T204, as indicated by the step 304'.

After establishing the voice path V204 and data path T204, the controller 200 may send a notification to the first CA 203 to inform that the second CA 204 will take over the service from the first CA 203. The notification may be in the form of: sending a message to the first CA 203 or any other means that provides the equivalent function. When both the first CA 203 and the second CA 204 are connected to the TRS server system 100, the text handler 202 is configured to forward only the text data generated by the first CA 203 to the user 104, and discard the text data generated by the second CA 204. However, if the controller 200 determines that the connection between the first CA 203 and the TRS server system 100 is unstable or lost, then the voice path V203 and data path T203 are terminated and the text handler 202 may forward the text data generated by the second CA 204 to the user 104 at the earliest possible time (e.g. immediately after the disconnection, immediately after the user 104 begins to talk and the peer 103 begins to listen, etc.) without the confirmation of the first CA 203.

Afterwards, the controller 200 may send the notification to the second CA 204 to inform that the second CA 204 has taken over the service from the first CA 203. The notification may be in the form of: sending the "Take Over Complete" message 309 to the second CA 204 or any other means that provides the equivalent function. Likewise, the controller 200 sends the notification to the first CA 203 so that the first CA 203 may clear up any resources or equipments used for providing the service. The notification may be in the form of sending the "Take Over Complete" message 310 to the first CA 203 or any other means that provides the equivalent function. In the case where the subsequent switch from the second CA 204 to a new CA is necessary, the second CA 204 will be treated as the first CA 203.

While the invention has been shown and described with reference to different embodiments thereof, it will be appreciated by those skilled in the art that variations in form, detail, compositions and operation may be made in these embodiments. Therefore, the scope of the present invention is not limited to the embodiments disclosed or illustrated herein.

REFERENCE NUMERALS

100 TRS Server System
103 Peer
104 User
105 Caption Center
105a Caption Center with human agents only
105b Caption Center with ASR only
105c Caption Center having a combination of human CAs and ASR
106 Call agent
107 Human CA and associated equipments
108 ASR engine and associated equipments
110 Equipment
111 Human
112 AI Machine
200 Controller
201 Voice Handler
202 Text Handler
203 First call agent (First CA)
204 Second call agent (Second CA)
301 "Take Over Require" Message
302 "Take Over Request" Message
303 "Take Over Accept" Message
304 Establish Voice Path V204
304' Establish Data Path T204
305 "Take Over Ready" Message
306 "Take Over Action Message
307 Terminate Voice Path V203
308 Terminate Data Path T203
309 "Take Over Complete" Message to second CA
310 "Take Over Complete" Message to first CA
321 Begin Transcription
322 Idle time
501 In Service State
V103 Voice Path between peer and TRS server system
V104 Voice Path between user and TRS server system
V105 Voice Path between TRS server system and Caption Center
V202 Voice Path between peer and voice handler
V203 Voice Path between first CA and voice handler
V204 Voice Path between second CA and voice handler
T104 Data Path between user and TRS server system
T105 Data Path between Caption Center and TRS server system
T202 Data Path between user and text handler
T203 Data Path between first CA and text handler
T204 Data Path between second CA and text handler

What is claimed is:

1. A system for switching call agents ("CAs") in telecommunications relay service ("TRS") wherein the call agents transcribe and convert a peer's voice into text data and provide the text data to a user of the TRS, the system comprising:
a TRS server system (100) including:
a voice handler (201) for processing voice data;
a text handler (202) for processing text data; and
a controller (200) for controlling, establishing, and terminating voice paths (V103, V203, V204) and data paths (T203, T204),
wherein the voice handler (201) is configured to receive the peer's voice via the voice path (V103) and transmit the peer's voice to the first CA (203) of a caption center (105) via the voice path (V203),
wherein the text handler (202) is configured to receive a first text data generated by the first CA (203) via the data path (T203), and forward the first text data to a user (104) via the data path (T202),
wherein the controller (200) is configured to:
select a second CA (204);
establish the voice path (V204) between the second CA (204) and the voice handler (201);
establish the data path (T204) between the second CA (204) and the text handler (202); and
terminate the voice path (V203) and the data path,
wherein the controller (200) is configured to initiate the selection of the second CA (204) when the controller (200) detects a network connection between the first CA (203) and the TRS server system (100) as being unstable or lost, and
wherein the second CA (204) is determined by considering at least a round-trip delay time between the TRS server system (100) and the second CA (204).

2. The system of claim 1, wherein:
the first CA (203) is a human CA (107) or an Automatic Speech Recognition engine (108); and
the second CA (204) is a human CA (107) or an Automatic Speech Recognition engine (108).

3. The system of claim 1, wherein the controller (200) is further configured to initiate the selection of the second CA (204) when the controller (200) receives a CA switch request from the first CA (203) or from the user (104).

4. The system of claim 1, wherein the second CA (204) is determined by further considering at least one or more of the following factors:
a user preference;
a language of the peer (103);
a type of spoken language of the peer (103);
a type of call;
previous client feedback; and
quality evaluation data of past transcripts.

5. The system of claim 1, wherein after the controller (200) establishes the voice path (V204) and data path (T204):

the voice handler (201) transmits the peer's voice to the first CA (203) via the voice path (V203), and to the second CA (204) via the voice path (V204); and the text handler (202) receives the first text data via the data path (T203), and receives a second text data generated by the second CA (204) via the data path (T204).

6. The system of claim 5, wherein after the controller (200) establishes the voice path (V204) and the data path (T204) and before the voice path (V203) and the data path (T203) are terminated, the text handler (202) forwards the first text data to the user (104) via the data path (T202) and discards the second text data.

7. The system of claim 5, wherein the controller (200) receives confirmation of the first CA (203) on termination of the voice path (V203) and data path (T203) before terminating the voice path (V203) and data path (T203), wherein a period of idle time (322) occurs before the confirmation of the first CA (203), the idle time (322) determined by one or more of the following factors:
a predefined minimum time period after the second CA (204) begins to generate the second text data;
a predefined maximum time period after the second CA (204) begins to generate the second text data; and
a predefined minimum word count of the second text data.

8. The system of claim 5, wherein after the voice path (V203) and the data path (T203) are terminated, the text handler (202) forwards the second text data to the user (104) via the data path (T202).

9. The system of claim 1, wherein after the controller (200) selects the second CA (204), the controller (200) sends a request to the second CA (204) to take over from the first CA (203).

10. The system of claim 1, wherein the voice handler (201) receives a user's voice via a voice path (V104), and transmits the user's voice to the peer (103) via the voice path (V103) without transmitting the user's voice to the caption center (105).

11. A method for switching call agents ("CAs") in telecommunications relay service ("TRS") wherein the call agents transcribe and convert a peer's voice into text data and provide the text data to a user of the TRS, comprising the steps of:

transmitting, via a voice path (V203), a peer's voice from a voice handler (201) of a TRS server system (100) to a first CA (203);
transmitting, via a data path (T203), a first text data generated by the first CA (203) to a text handler (202) of the TRS server system (100);
forwarding, via a data path (T202), the first text data from the text handler (202) to the user (104);
selecting a second CA (204) by a controller (200) of the TRS server system (100);
establishing, by the controller (200), a voice path (V204) between the voice handler (201) and the second CA (204);
establishing, by the controller (200), a data path (T204) between the text handler (202) and the second CA (204); and
terminating, by the controller (200), the voice path (V203) and data path (T203) associated with the first CA (203),
wherein the step of selecting the second CA (204) is initiated when the controller (200) detects a network connection between the first CA (203) and the TRS server system (100) as being unstable or lost, and wherein the second CA (204) is determined by considering at least a round-trip delay time between the TRS server system (100) and the second CA (204).

12. The method of claim 11, wherein the step of selecting the second CA (204) is further initiated when the controller (200) receives a CA switch request from the first CA (203) or from the user (104).

13. The method of claim 11, wherein the second CA (204) is determined by further considering at least one or more of the following factors:
a user preference;
a language of the peer (103);
a type of spoken language of the peer (103);
a type of call;
previous client feedback; and
quality evaluation data of past transcripts.

14. The method of claim 11, further comprising the steps of:
transmitting, via the voice path (V204), the peer's voice from the voice handler (201) to the second CA (204) after the step of establishing the voice path (V204); and
transmitting, via the data path (T204), a second text data generated by the second CA (204) to the text handler (202) after the step of establishing the data path (T204).

15. The method of claim 14, further comprising the step of:
forwarding the first text data from the text handler (202) to the user (104) via the data path (T202), and discarding the second text data before terminating the voice path (V203) and data path (T203).

16. The method of claim 14, further comprising the step of:
forwarding the second text data from the text handler (202) to the user (104) via the data path (T202) after the termination of the voice path (V203) and the data path (T203).

17. The method of claim 14, further comprising the step of:
receiving, by the controller (200), a confirmation of the first CA (203) on termination before terminating the voice path (V203) and the data path (T203),
wherein a period of idle time (322) occurs before the confirmation of the first CA (203), the idle time (322) determined by one or more of the following factors:
a predefined minimum time period after the second CA (204) begins to generate the second text data;
a predefined maximum time period after the second CA (204) begins to generate the second text data; and
a predefined minimum word count of the second text data.

18. The method of claim 11, further comprising the steps of:
sending, from the controller (200) to the second CA (204), a request to take over from the first CA (203) after the step of selecting the second CA (204); and
sending, from the second CA (204) to the controller (200), an acknowledgement to accept the request in response to the step of sending the request.

19. The method of claim 11, further comprising the step of:
receiving, via a voice path (V104), a user's voice by the voice handler (201), and transmitting the user's voice to the peer (103) via the voice path (V103) without transmitting the user's voice to the caption center (105).

20. The method of claim 11, wherein:
the first CA (203) is a human CA (107) or an Automatic Speech Recognition engine (108); and
the second CA (204) is a human CA (107) or an Automatic Speech Recognition engine (108).

\* \* \* \* \*